United States Patent Office 3,481,633
Patented Dec. 2, 1969

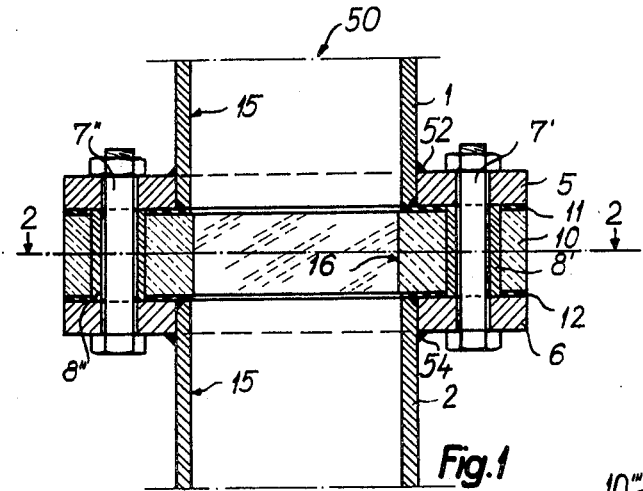
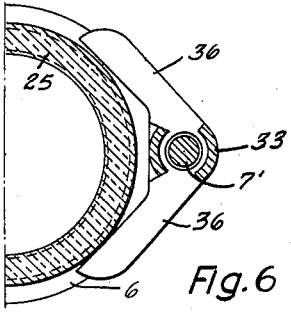
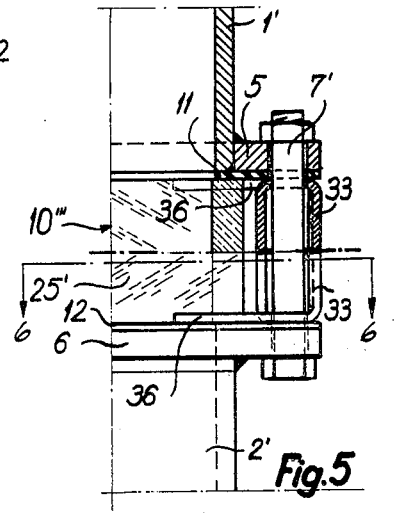
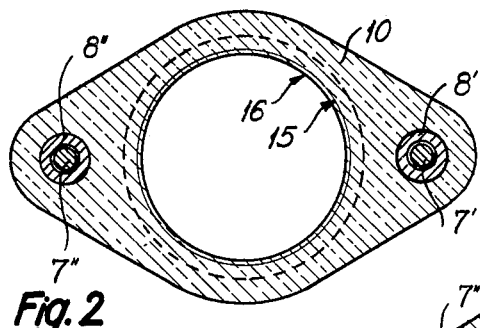
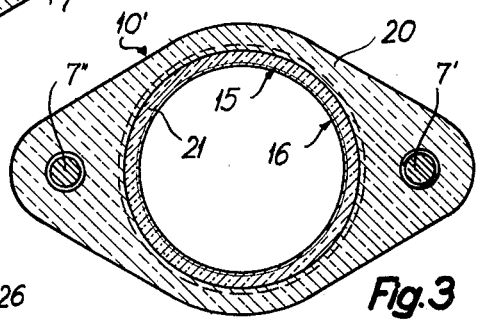
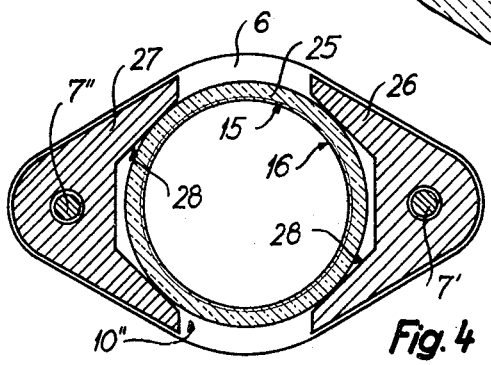
INVENTOR.
PETER HANS SCHÖNHOLZER

3,481,633
TUBULAR CONDUIT CONSTRUCTION
Peter Hans Schönholzer, Kobelhohe, Switzerland, assignor to Gebruder Buhler AG, Uzwil, Switzerland
Filed Mar. 29, 1968, Ser. No. 717,205
Claims priority, application Switzerland, Aug. 25, 1967, 11,980/67
Int. Cl. F16l 55/00
U.S. Cl. 285—93          11 Claims

ABSTRACT OF THE DISCLOSURE

A tubular conduit construction includes two sections which are hollowed for the flow of material therethrough and which are joined together by mating flanges and clamping elements and with an intermediate flange therebetween which is at least partially transparent in a direction transverse to the transport direction of the material through the conduit.

---

This invention relates in general to the construction of tubular conduits and, in particular, to a new and useful tubular conduit made up of individual tubular sections which are joined together by flanges and clamping elements and which include a transparent intermediate portion between the two elements.

It is known to make parts of a material conduit transparent in order to control the material which is moving therethrough. Various proposals have been made for using such transparent sections in pipe lines. One proposal consists in the interruption of the pipe line and the insertion of transparent pipe section having ends which are held in the main pipe conduit by rubber cuffs or sleeves. To hold the two abutting pipe sections in position a flange and tie rod arrangement are necessary. Such a construction is costly and not very reliable at high pressures of the transport medium. In addition, the construction is complicated in view of the fact that it may be necessary to replace the transparent pipe section. It is also necessary to avoid any deterioration of a joint by excessive axial torsional, or bending forces and the tie rod attachment of two contiguous pipe sections is not sufficient.

It also has been proposed to use special combination sockets or sleeves having a metal casting interrupted by individual windows and wherein a transparent pipe section is inserted. Such a construction has a disadvantage that any necessary replacement of the transport pipe section in a pipe line once installed is extremely complicated and the construction is expensive.

A further proposal is to provide an opening in a transport pipe and to cover this opening by a transparent seal which is adapted to the configuration of the pipe. The disadvantage of such a construction is that the operating conditions which prevail in transport lines can be observed from only one side and with great difficulty. In addition, a view completely through the material is not possible but only through a window and against the opposite wall of the opaque conduit. Without additional lumination the view is too dark for satisfactory operation. A further difficulty of course, is the problem of sealing the construction, and transparent shell type seal parts cannot be manufactured with any desirable variable curvature very easily.

In accordance with the present invention there is provided a tubular conduit which includes an easily insertable exchangeable transparent intermediate piece which may be arranged between conduit parts in a manner which permits the observation of transport conditions in the conduit from practically any point transverse to the conduit and without any danger of breakage to the transparent device. This is achieved by arranging the intermediate flange so that it is at least partially transparent crosswise to the direction of conveyance of the material which is conveyed through the conduit, and which is fitted between the flanges of two sections of the conduit.

Accordingly, it is an object of the invention to provide a tubular conduit construction which includes an intermediate flange section which is joined to two separate main sections of the conduit by clamping elements and flange joints and wherein the intermediate element is transparent at least partially in a direction transverse to the transport direction through the conduit.

A further object of the invention is to provide a conduit construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:
FIG. 1 is a partial longitudinal section through two abutting main conduit portions of a transport conduit having an intermediate transparent section constructed in accordance with the invention;
FIG. 2 is a section taken along line 2—2 of FIG. 1;
FIG. 3 is a section similar to FIG. 2 of another embodiment of the invention;
FIG. 4 is a section similar to FIG. 2 of still another embodiment of the invention;
FIG. 5 is a partial elevational and partial longitudinal sectional view of still another embodiment of the invention; and
FIG. 6 is a partial section taken on the line 6—6 of FIG. 5.

GENERAL DESCRIPTION OF THE PREFERRED EMBODIMENTS

Referring to the drawings in particular, the invention embodied therein as indicated in FIGS. 1 and 2 comprises a transport conduit or pipe generally designated 50 which includes a first section 1 and a second section 2 of an opaque material such as metal having respective flanges 5 and 6 at their ends which are affixed thereto such as by welding at 52 and 54 respectively.

In accordance with the invention the conduit sections 1 and 2 are joined to an intermediate flange member or transparent insert 10 by clamping elements such as bolts 7' and 7" which extend through reinforcing sleeves or spacers 8' and 8" and are tightened against the respective flanges 5 and 6. The sleeves 8' and 8" absorb compressed stresses of the joint and provide spacers between the flanges 5 and 6 with a sufficient spacing to accommodate intermediate packing elements 11 and 12 respectively. In the embodiment illustrated the intermediate flange member 10 is provided with a bore 16 having a diameter somewhat smaller than the diameter 15 of the conduit 50.

The conduit construction provides the following advantages: The assembly of the individual sections 1 and 2 of the opaque conduit portion can be easily and quickly effected. It is not necessary to provide special retention elements on both sides of the transparent intermediate part 10 since the spacing pipes 8' and 8" prevent an excessive compressive stress at the intermediate member 10 and hence the danger of destruction of this part. The packing 11 and 12 is correctly prestressed directly by the production of the union of the individual conduit sections 1 and 2. The construction proves exceeding simple and advantageous especially for conduit having interposed pipe switches. In such construction the transparent intermediate flange member 10 is arranged in the vicinity of such switches. Since such switches are often installed at ceiling locations it is very desirable to be able to observe the behavior in certain pipe line sections from any point in the operating room. The device of the invention satisfactorily fills this requirement.

The intermediate flange member 10 may be made of any suitable material to provide the necessary transparency and rigidity of the overall pipe construction. The type of material which may be chosen will be in dependence upon the material to be transported through the conduit but may for example, be a suitable transparent is very resistant to wear and an externally tough transparent material such as Plexiglas would be satisfactory.

In the embodiment illustrated in FIG. 3 an intermediate flange member 10' is made up of two different transparent materials including an internal portion 21 which is very resistent to wear and an externally tough transparent material 20 which is capable of resisting compressive stresses. An ordinary glass material may be used as the member 21 and a Plexiglas material may be used as the outer member 20. It is also advantageous to employ a thin layer of transparent material resistent to abrasion on the inner surface of the Plexiglas element 21.

In the embodiment indicated in FIG. 4 an intermediate flange member 10" is divided into a transparent pipe piece 25 flange parts 26 and 27 arranged on respective opposite ends and provided with bores for receiving the clamping bolts 7' and 7". The flange parts 26 and 27 are made of a material which may absorb high compression loads such as steel, aluminum, hard plastic, etc. The flange parts 26 and 27 each include prismatic retention formation 28 for centering the pipe piece 25. The advantage of such a construction is that a commercial transparent pipe of a glass material Plexiglas or other suitable material can be used and yet the entire flange connection provides substantially the same advantages as that indicated in FIGS. 1 and 2. The principal disadvantage is that the field of vision through the intermediate member 10" is limited unless the flange elements 26 and 27 are also made of a transparent material which is capable of absorbing large compressive stresses.

In FIG. 5 there is indicated a variation of a construction indicated in FIG. 4. In this construction an intermediate flange member 10''' includes a tubular transparent member 25' which is held in position by bifurcated retaining legs 36 which are at least partially made of a sheet metal material and which are provided with bores to accommodate the through bolts 7'. The holding legs 36 cover only a section of the transparent pipe element 25'. In the zone of the clamping element 7' the sheet metal is deep drawn or bent to form spacing legs 33. Such flanges part halves can be welded together or as indicated clamped together simply by clamping bolts 7'. The complete joint includes the packings 11 and 12 arranged between the opaque conduit 1' and 2'. The spacing legs 33 may be formed as sleeves extending between packing elements 11 and 12 and they limit the excessive compression of the flanges 5 and 6 against the packings.

The arrangement of FIG. 5 offers an advantage in respect to the vision field over that of FIG. 4 inasmuch as the exposed transparent surface of the pipe member 25' is greater.

While only two clamping bolt members 7' and 7" have been shown it is of course possible to provide a greater or lesser number as desired. In some instances it may be desirable that the bore diameter 15 be made smaller than the bore diameter 16 or equal to this diameter. The conduit sections 1 and 2 may be main conduit sections or transport pipe portions with interposed elements such as pipe switches, cut-off valves, forks, branches, etc. Such an arrangement permits a substantial simplification of the conduit construction when transparent observation points are required. The transparent points permit immediate observation without any intervention and are applicable preferably in the area of the pneumatic conveyances of bulk materials, fluid conveyance of suspensions, dross or pulp or etc.

While specific embodiments of the invention have been shown and described in detail to illustrate the application of the inventive principles, it will be understood that the invention may be embodied otherwise without departing from such principles.

What is claimed is:

1. A tubular conduit construction comprising first and second conduit sections arranged in spaced opposed end to end relationship, each of said conduits terminating in an end having an end flange, said end flanges having radially extending end faces, an intermediate flange member disposed between the flanges of said first and second conduit sections and having an annular tubular transparent first portion and a second portion, one of said portions having a greater axial length than the other to engage said end faces and to prevent excessive compressive stresses on said other portion, packing disposed between and sealingly engaging said end flanges and said other portion of the intermediate flange member, and means for clamping said intermediate flange member to the flanges of said first and second conduit sections including bolt means extending axially through each of said end flanges and said intermediate flange member, said intermediate flange member having at least a portion which, in a direction transverse to the transport direction, is transparent.

2. A tubular conduit construction according to claim 1, wherein said intermediate flange member is made entirely of a transparent material.

3. A tubular conduit construction according to claim 1, wherein said intermediate flange member includes an inner portion of glass material having an inner surface which contacts the material being transported through the conduit and a surrounding outer portion of a transparent plastic material.

4. A tubular conduit construction according to claim 1, wherein said intermediate flange member has an internal diameter which is smaller than that of said first and second conduit sections.

5. A tubular conduit construction according to claim 1, wherein said intermediate flange member has portions around said clamping bolt means bearing against respective flanges of said first and second conduit sections and bearing the compressive clamping forces.

6. A tubular conduit construction according to claim 1, wherein said intermediate flange member comprises a tubular portion and separate flange members on each side of said tubular portion bearing against and centering said tubular portion between said first and second conduit sections.

7. A tubular conduit construction according to claim 6, wherein said flange portions are a prismatic configuration and bear at two spaced circumferential locations against said tubular conduit at respective sides thereof.

8. A tubular conduit construction according to claim 1, wherein said intermediate flange member includes a cylindrical portion and a holding finger portion engaged with said cylindrical portion adjacent each end thereof, and a spacing sleeve portion between said finger portions disposed between said flanges of said first and second main pipe section.

9. A tubular conduit construction comprising first and second conduit sections arranged in spaced opposed end to end relationship, each of said conduits terminating in an end having a flange, an intermediate flange member disposed between the flanges of said first and second conduit sections, means for clamping said intermediate flange member to the flanges of said first and second conduit sections, said intermediate flange member having at least a portion which, in a direction transverse to the transport direction, is transparent, said clamping means comprising a securing member extending through the flanges of said first and second conduit sections and through said intermediate flange member, said intermediate flange member having conduit flange-engaging portions around said securing member bearing against respective flanges of said first and second conduit sections and bearing the compressive clamping forces, said conduit flange engaging portions comprising reinforcing sleeves of a greater length than said intermediate flange member so as to bear against the respective flanges, and packing means disposed between said flange members and said intermediate flange member around the inner surfaces of said flange members of said first and second conduit sections and said intermediate flange member.

10. A tubular conduit construction comprising first and second conduit sections arranged in spaced opposed end to end relationship, each of said conduits terminating in an end having a flange, an intermediate flange member disposed between the flanges of said first and second conduit sections, means for clamping said intermediate flange member to the flanges of said first and second conduit sections, said intermediate flange member having at least a portion which, in a direction transverse to the transport direction is transparent, said intermediate flange member and said flanges of said first and second pipe sections having aligned sets of bores, a clamping bolt extending through each of the sets of aligned bores, a reinforcing sleeve in the aligned bores of said intermediate flange member and extending outwardly from each surface of said intermediate flange member and bearing against the respective flanges of said first and second pipe sections, and packing means disposed between said intermediate flange member and in the respective flanges of said first and second pipe sections around the inner surfaces of said flanges and said intermediate flange member.

11. A tubular conduit construction comprising first and second conduit sections of non-transparent material arranged in spaced opposed end to end relationship, each of said conduits having an end flange with a radially extending end face, an intermediate flange member disposed between the flanges of said first and second conduits having an annular tubular transparent first portion and a second portion, one of said portions having a greater axial length than the other to engage between the end faces of the respective flanges of each of said conduits, packing means for sealing said other portion of the intermediate flange between said end flanges, said transparent first portion of said intermediate flange extending in a direction transverse to the transport direction, and means for axially forcing the flanges of said first and second conduit sections toward each other to clamp said intermediate flange therebetween whereby said one portion engages said end faces and prevents excessive compressive stress on said other portion.

References Cited

UNITED STATES PATENTS

| | | | |
|---|---|---|---|
| 1,042,730 | 10/1912 | Walquist | 285—93 X |
| 1,884,223 | 10/1932 | Rah | 285—368 X |
| 2,127,578 | 8/1938 | Wyman | 285—363 X |
| 2,144,706 | 1/1939 | Pescara | 285—363 X |
| 2,294,160 | 8/1942 | Crane et al. | |
| 2,786,696 | 3/1957 | Feldmeier | 285—93 X |
| 2,985,466 | 5/1961 | Solomon et al. | 285—93 X |
| 3,381,976 | 5/1968 | Goodson et al. | |

FOREIGN PATENTS

| | | |
|---|---|---|
| 972,330 | 10/1964 | Great Britain. |

THOMAS F. CALLAGHAN, Primary Examiner

U.S. Cl. X.R.

285—363